(12) United States Patent
Matsushima

(10) Patent No.: US 10,057,480 B2
(45) Date of Patent: Aug. 21, 2018

(54) ELECTRONIC APPARATUS AND CONTROL METHOD THEREOF

(71) Applicant: CANON KABUSHIKI KAISHA, Tokyo (JP)

(72) Inventor: Shuichiro Matsushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/287,135

(22) Filed: Oct. 6, 2016

(65) Prior Publication Data

US 2017/0104922 A1 Apr. 13, 2017

(30) Foreign Application Priority Data

Oct. 9, 2015 (JP) ................................. 2015-201540

(51) Int. Cl.
*H04N 5/232* (2006.01)

(52) U.S. Cl.
CPC ..... *H04N 5/23216* (2013.01); *H04N 5/23241* (2013.01); *H04N 5/23245* (2013.01); *H04N 5/23293* (2013.01)

(58) Field of Classification Search
CPC ........... H04N 5/23216; H04N 5/23241; H04N 5/23245; H04N 5/23293
USPC .................................................. 348/333.02
See application file for complete search history.

(56) References Cited

U.S. PATENT DOCUMENTS

| 9,179,090 | B2 | 11/2015 | Ise et al. | |
|---|---|---|---|---|
| 2012/0146929 | A1* | 6/2012 | Oyama | H04N 5/23293 345/173 |
| 2014/0035804 | A1* | 2/2014 | Dearman | H04M 1/72544 345/156 |
| 2014/0068752 | A1* | 3/2014 | Choi | G06F 21/36 726/16 |
| 2014/0375862 | A1* | 12/2014 | Kim | H04N 5/23216 348/333.02 |
| 2016/0055342 | A1* | 2/2016 | Bivona | G06F 21/62 726/26 |

FOREIGN PATENT DOCUMENTS

JP 2013-196367 A 9/2013

* cited by examiner

*Primary Examiner* — Nhan T Tran
(74) *Attorney, Agent, or Firm* — Carter, Deluca, Farrell & Schmidt, LLP

(57) ABSTRACT

An electronic apparatus comprises a detection unit configured to detect a touch operation on a touch sensitive surface, an operation unit that is located at a position different from a position of the touch sensitive surface, and a control unit configured to, when neither the touch operation nor an operation on the operation unit has been performed for a first period, perform control to switch to a lock state without hiding display on a display unit, the lock state restricting execution of a function corresponding to the touch operation, and upon accepting the operation on the operation unit during the lock state, perform control to switch to a state in which the function corresponding to the touch operation is executed by releasing the lock state, and to execute a function corresponding to the operation on the operation unit.

26 Claims, 7 Drawing Sheets

FIG. 5A

```
CAMERA SETTING MENU
  ELECTRONIC SOUND        ON
  FUNCTION GUIDE          ON
  DISPLAY-OFF             1 MIN
  TOUCH OPERATION         ENABLE
  TOUCH-LOCK SETTINGS
```

FIG. 5B

```
TOUCH-LOCK SETTINGS
  TOUCH-LOCK              ENABLE
  PERIOD UNTIL LOCK       10 SEC
```

FIG. 5C

```
TOUCH-LOCK SETTINGS
  PERIOD UNTIL LOCK    3 SEC
                       5 SEC
                       7 SEC
                       10 SEC
                       15 SEC
                       20 SEC
```

ELECTRONIC APPARATUS AND CONTROL METHOD THEREOF

BACKGROUND OF THE INVENTION

Field of the Invention

The present invention relates to an electronic apparatus and a control method thereof, and especially to a technique for preventing an erroneous operation caused by a touch operation on a touch panel.

Description of the Related Art

With the recent spread of electronic apparatuses equipped with touch panels, for example, an increasing number of digital cameras are incorporating touch panels. Digital cameras equipped with touch panels enable intuitive operations, such as an operation of selecting an object by touching the object while checking a live view image. At the same time, such digital cameras have a risk of triggering an erroneous operation that is not intended by a user due to, for example, accidental or involuntary contact with the touch panels. There are methods for preventing an erroneous operation caused by a touch operation on a touch panel, and one example is a digital camera capable of setting a touch operation on a touch panel to be valid or invalid (Japanese Patent Laid-Open No. 2013-196367).

When a touch operation on a touch panel is set to be invalid as described in Japanese Patent Laid-Open No. 2013-196367, there is no need to take into consideration an erroneous operation caused by a touch operation, but the usability is reduced because the touch panel does not accept any operation.

SUMMARY OF THE INVENTION

The present invention has been made in consideration of the aforementioned problems, and realizes a technique for preventing an erroneous operation caused by a touch operation on a touch panel while suppressing a reduction in the usability of the touch panel.

In order to solve the aforementioned problems, the present invention provides an electronic apparatus, comprising: a detection unit configured to detect a touch operation on a touch sensitive surface; an operation unit that is located at a position different from a position of the touch sensitive surface; and a control unit configured to when neither the touch operation nor an operation on the operation unit has been performed for a first period, perform control to switch to a lock state without hiding display on a display unit, the lock state restricting execution of a function corresponding to the touch operation, and upon accepting the operation on the operation unit during the lock state, perform control to switch to a state in which the function corresponding to the touch operation is executed by releasing the lock state, and to execute a function corresponding to the operation on the operation unit.

In order to solve the aforementioned problems, the present invention provides a control method of an electronic apparatus having a detection unit configured to detect a touch operation on a touch sensitive surface and an operation unit that is located at a position different from a position of the touch sensitive surface, the method comprising: when neither the touch operation nor an operation on the operation unit has been performed for a first period, performing control to switch to a lock state without hiding display on a display unit, the lock state restricting execution of a function corresponding to the touch operation, and upon accepting the operation on the operation unit during the lock state, performing control to switch to a state in which the function corresponding to the touch operation is executed by releasing the lock state, and also to execute a function corresponding to the operation on the operation unit.

In order to solve the aforementioned problems, the present invention provides an electronic apparatus, comprising: a detection unit configured to detect a touch operation on a touch sensitive surface; an operation unit that is located at a position different from a position of the touch sensitive surface; a display control unit configured to perform control to display a live view image captured by an image capturing unit on a display unit, and a control unit configured to, when neither the touch operation nor an operation on the operation unit has been performed for a first period during a shooting standby state in which the live view image is displayed, perform control to switch to a lock state without hiding the display of the live view image on the display unit, the lock state restricting execution of a function corresponding to the touch operation.

In order to solve the aforementioned problems, the present invention provides a control method of an electronic apparatus having a detection unit configured to detect a touch operation on a touch sensitive surface and an operation unit that is located at a position different from a position of the touch sensitive surface, the method comprising: when neither the touch operation nor an operation on the operation unit has been performed for a first period during a shooting standby state in which a live view image is displayed, performing control to switch to a lock state without hiding the display of the live view image on a display unit, the lock state restricting execution of a function corresponding to the touch operation.

In order to solve the aforementioned problems, the present invention provides a non-transitory computer-readable storage medium storing a program for causing a computer to function as a control unit of an electronic apparatus having a detection unit configured to detect a touch operation on a touch sensitive surface and an operation unit that is located at a position different from a position of the touch sensitive surface, wherein the control unit, when neither the touch operation nor an operation on the operation unit has been performed for a first period, performs control to switch to a lock state without hiding display on a display unit, the lock state restricting execution of a function corresponding to the touch operation, and upon accepting the operation on the operation unit during the lock state, performs control to switch to a state in which the function corresponding to the touch operation is executed by releasing the lock state, and to execute a function corresponding to the operation on the operation unit.

In order to solve the aforementioned problems, the present invention provides a non-transitory computer-readable storage medium storing a program for causing a computer to function as a display control unit and a control unit of an electronic apparatus having a detection unit configured to detect a touch operation on a touch sensitive surface and an operation unit that is located at a position different from a position of the touch sensitive surface, wherein the display control unit performs control to display a live view image captured by an image capturing unit on a display unit, and the control unit, when neither the touch operation nor an operation on the operation unit has been performed for a first period during a shooting standby state in which the live view image is displayed, performs control to switch to a lock state without hiding the display of the live view image on the display unit, the lock state restricting execution of a function corresponding to the touch operation.

According to the present invention, an erroneous operation caused by a touch operation on a touch panel can be prevented while suppressing a reduction in the usability of the touch panel.

Further features of the present invention will become apparent from the following description of exemplary embodiments (with reference to the attached drawings).

BRIEF DESCRIPTION OF THE DRAWINGS

FIGS. 5A to 5C show examples of menu screens on which settings of the touch-lock function can be configured.

DESCRIPTION OF THE EMBODIMENTS

Embodiments in which an electronic apparatus according to the present invention is applied to a digital camera that has a tilt type display unit provided with a touch panel will be described below in detail with reference to accompanied drawings.

<Apparatus Configuration>

The appearance and internal configuration of a digital camera according to the present embodiment will be described below with reference to FIGS. 1, 2A and 2B.

Figure 1:
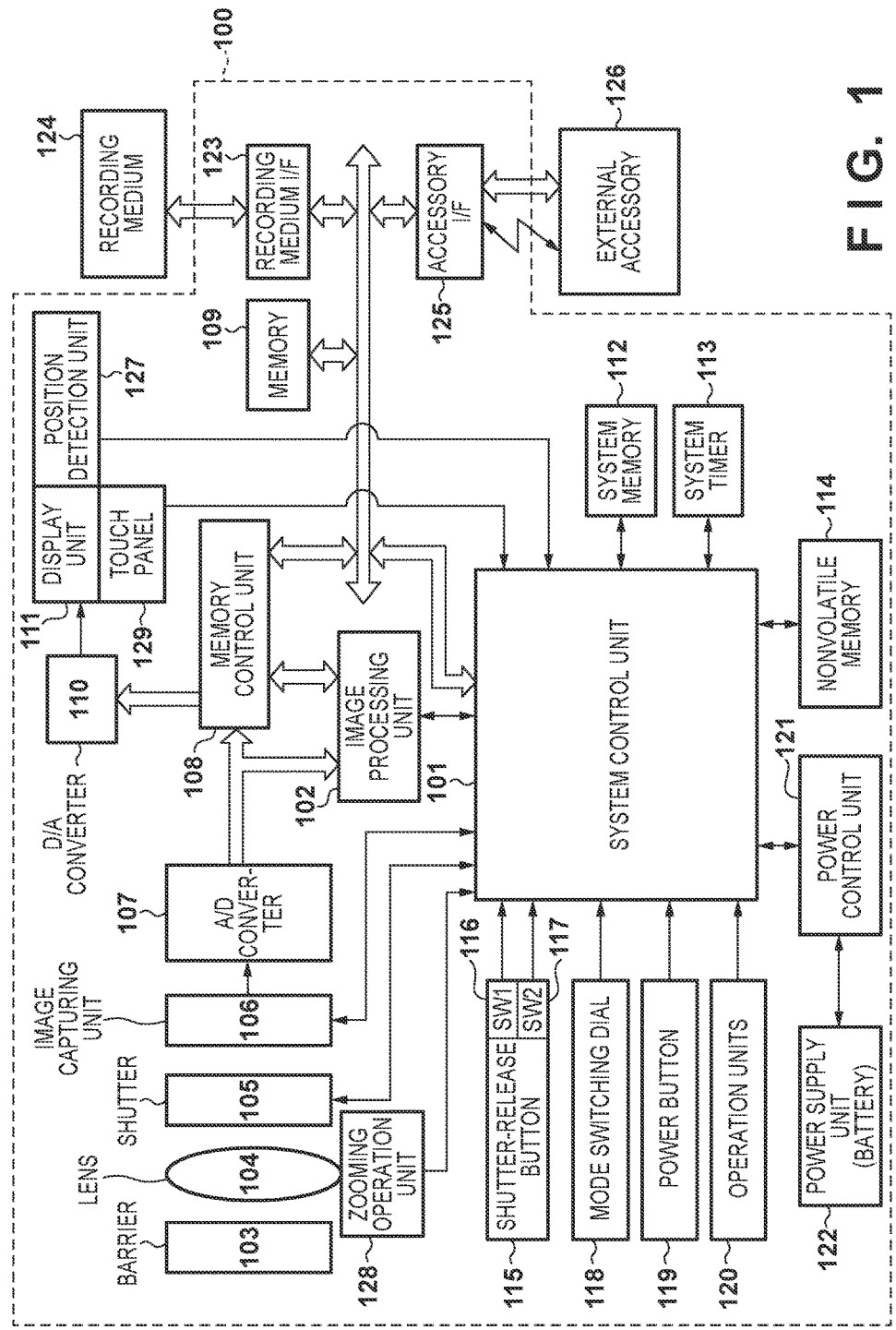
FIG. 1 is a block diagram showing an internal configuration of an electronic apparatus according to the present embodiment.

In FIG. 1 which shows an internal configuration of a digital camera 100 according to the present embodiment, a photographing lens 104 is a lens group includes a zoom lens and a focusing lens. A shutter 105 has a diaphragm function. An image capturing unit 106 is an image sensor, which is constituted by a CCD or CMOS or the like, for converting the optical image of an object to an electric signal. An A/D converter 107 converts an analog signal to a digital signal. The A/D converter 107 is used to convert an analog signal, which is output from the image capturing unit 106, to a digital signal. A barrier 103 covers the image capturing system (which includes the photographing lens 104) of the digital camera 100, thereby preventing contamination of and damage to the image capturing system that includes the photographing lens 104, shutter 105 and image capturing unit 106. Note that the photographing lens 104 may be fixed to or detachable from the digital camera 100.

An image processing unit 102 performs resizing processing, such as predetermined pixel interpolation and reduction, and color conversion processing, with respect to data from the A/D converter 107 or data from a memory control unit 108. Further, the image processing unit 102 performs predetermined calculation processing using the captured image data, and the system control unit 101 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 102 performs predetermined calculation processing using the captured image data, and AWB (Automatic White Balance) processing of TTL type is performed on the basis of the calculation results.

The output data from the A/D converter 107 is directly written into a memory 109 via both the image processing unit 102 and the memory control unit 108 or via the memory control unit 108. The memory 109 stores the image data obtained from the image capturing unit 106 and the A/D converter 107, and image display data to be displayed on the display unit 111. The memory 109 has a storage capacity that is sufficient for storing a predetermined number of still images as well as moving images and audio for a predetermined time period.

The memory 109 also functions as a memory for image display (video memory). A D/A converter 110 converts the image display data stored in the memory 109 into an analog signal and applies the display unit 111 with the analog signal. The image display data that was written into the memory 109 is displayed by the display unit 111 via the D/A converter 110. The display unit 111 performs, on a display device such as an LCD, display in accordance with the analog signal from the D/A converter 110. A predetermined signal processing of the digital signal once converted by the A/D converter 107 and stored in the memory 109 is performed by the image processing unit 102 and then stored in the memory 109. In this manner, the digital signals stored in the memory 109 are converted into analog signals, and the analog signals are successively transmitted to the display unit 111 so as to be displayed thereon, making it possible to realize an electronic view finder (EVF) functionality and to perform through the lens image display by a live view.

A nonvolatile memory 114 is, for example, an EEPROM, which is electrically erasable and recordable. In the nonvolatile memory 114, constants and programs, for example, for operating the system control unit 101 are stored. In this context, "programs" may refer to programs for executing various flowcharts that will be described later.

The system control unit 101 is a calculation processing device for overall controlling the entire camera 100, and realizes, by executing the programs stored in the nonvolatile memory 114, the procedures of the flowchart that will be described later. The system memory 112 is, for example, a RAM and used also as a work memory where constants and variables for operating the system control unit 101, and the programs read out from the nonvolatile memory 114 are expanded. The system control unit 101 controls the memory 109, the D/A converter 110, the display unit 111, and the like, so as to perform display control.

A system timer 113 is a timer circuit for measuring time periods for various types of controls and the time of an integrated clock.

A shutter-release button 115, a mode switching dial 118, a power button 119, operation units 120 and a zooming operation unit 128 are operation members for inputting various types of instructions into the system control unit 101.

A shutter-release button 115 is an operation member for a shooting preparation instruction or a shooting instruction. A power button 119 is an operation unit for switching between power on and power off. Operation units 120 comprise operation members such as various switches, buttons, and a touch panel for accepting various operations by the user. A zooming operation unit 128 is an operation member for an instruction for changing a zoom magnification between a wide-angle end and a telephoto end by the user.

The mode switching dial 118 is a rotary type operation member for switching the operation mode of the system control unit 101 to any of a still image shooting mode, a moving image recording mode, a reproduction mode and more detailed operation modes thereof.

While the shutter-release button 115 provided on the camera 100 is being operated, that is, pressed half-way (the shooting preparation instruction), the first shutter switch 116 is turned on and generates a first shutter switch signal SW1. Upon receiving the first shutter switch signal SW1, the system control unit 101 causes the image processing unit 102 to start the AF (Automatic Focus) processing, the AE (Automatic Exposure) processing, the AWB (Automatic White Balance) processing, the EF (flash pre-emission) processing and the like.

When the operation of the shutter-release button 115 is completed, that is, the shutter-release button 115 is pressed fully (the shooting instruction), the second shutter switch 117 is turned on and generates a second shutter switch signal SW2. Upon receiving the second shutter switch signal SW2, the system control unit 101 starts a series of shooting processing from reading out the signal from the image capturing unit 106 to writing of image data to the recording medium 124.

A power control unit 121 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 121 controls the DC-DC converter in accordance with the detection results and an instruction of the system control unit 101, and supplies a necessary voltage for a necessary length of time to each of the units including the recording medium 124.

A power supply unit 122 comprises a primary battery such as an alkaline battery or a lithium battery, a secondary battery such as an NiCd battery, an NiMH battery, or an Li-ion battery, or an AC adaptor. In the present embodiment, a secondary battery is used as the power supply unit 122 by way of example. The recording medium interface (I/F) 123 is for interfacing with the recording medium 124 such as the memory card or hard disk. The recording medium 124 is a recording medium such as a memory card for recording shot images, and constituted by a semiconductor memory, a magnetic disk, or the like.

An accessory I/F 125 communicates with an external accessory 126, which is an external electronic view finder, an external flash, or a similar external device mountable on the digital camera 100, so as to exchange video/audio signals, control light emission, etc.

Note that the hardware configuration is not limited to that shown in FIG. 1, and a configuration is also possible in which, for example, a single item of hardware performs display control, communication control, shooting control, image processing control, and the like, so as to function as each unit or block of the digital camera 100. Alternatively, it is also possible that a plurality of items of hardware operate in cooperation with each other to function as a single unit or block.

Figure 2A:
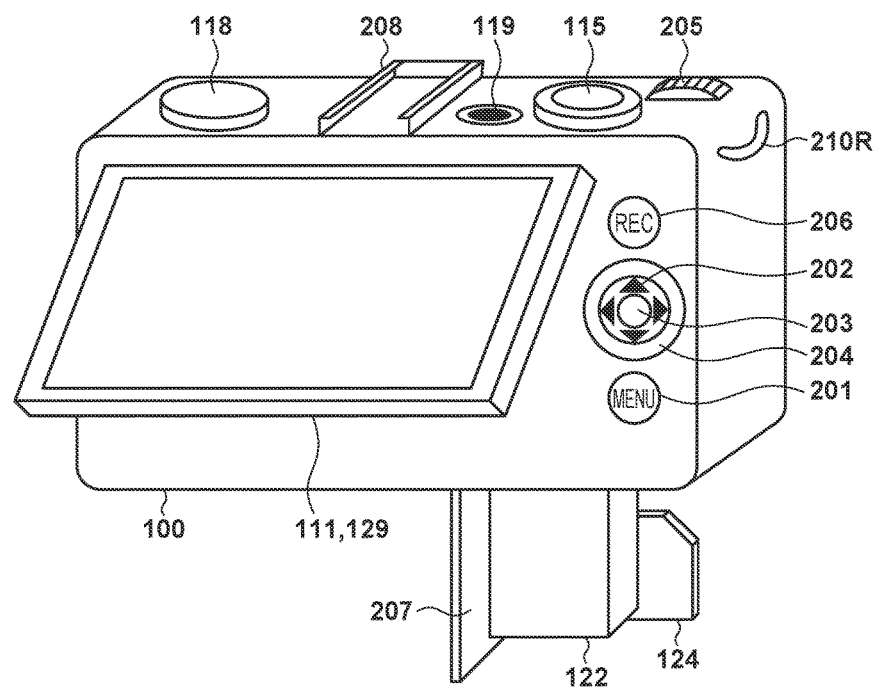
FIGS. 2A and 2B are diagrams showing an appearance of an electronic apparatus according to a present embodiment.
Figure 2B:
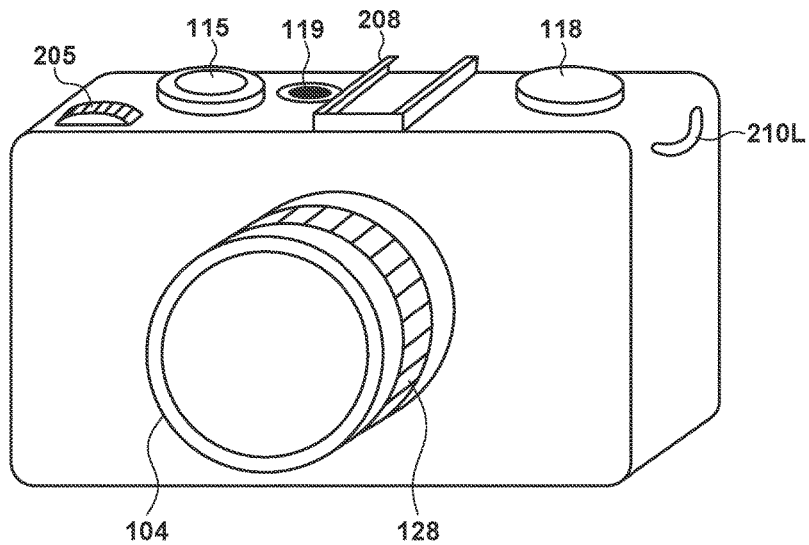

In FIGS. 2A and 2B, which show the appearance of the digital camera 100 according to the present embodiment, the back face of the digital camera 100 that is opposite to the photographing lens 104 is provided with the display unit 111 that displays images and various types of information, as well as a part of the later-described operation units 120, whereas the front face that is on the side of the photographing lens 104 is provided with the photographing lens 104 and the zooming operation unit 128. The top face of the digital camera 100 is provided with the shutter-release button 115, the mode switching dial 118, the power button 119, a part of the later-described operation units 120, and an accessory shoe 208. The bottom face of the digital camera 100 is provided with slots for storing the battery 122 and the recording medium 124, as well as a cover 207 that opens and closes the slots for inserting or removing the battery 122 and the recording medium 124. FIG. 2A shows a state in which the battery 122 and the recording medium 124 are partially exposed as they are being removed from the slots by opening the cover 207. The left and right side faces of the digital camera 100 are provided with strap attachment members 210L, 210R.

By selecting various functional icons displayed on the display unit 111, appropriate functions for each situation are assigned to each operation member of the operation units 120, and the operation units 120 thus act as various function buttons. Examples of these function buttons include an end button, a back button, an image scrolling button, a jump button, a narrow-down button, an attribute change button, and a menu button. For example, a notification for a menu switching instruction is given and a menu screen that enables various settings to be made is displayed on the display unit 111 by pressing the menu button 201. The user can make various settings intuitively by using the menu screen, which is displayed on the display unit 111, a cross key 202 having four-direction (up, down, left, right) buttons and a SET button 203. Note that the SET button 203 doubles as a FUNC button, and when the FUNC button is pressed during a shooting standby state, a setting screen related to shooting can be superimposed on a live view image displayed on the display unit 111. The controller wheel 204 and an electronic dial 205, which are rotatable operation members included among the operation units 120, are used together with the direction buttons as when a selection item is specified. When the controller wheel 204 and the electronic dial 205 are turned, an electrical pulse signal is generated in accordance with the amount of rotation, and the system control unit 101 controls each unit of the digital camera 100 based upon the pulse signal. The angle through which the controller wheel 204 or the electronic dial 205 has been turned and how many times it has been turned can be determined by the pulse signal. It should be noted that the controller wheel 204 or the electronic dial 205 can be any operating member so long as it is an operating member whose rotation can be detected. For example, it can be a dial operating member in which the controller wheel 204 or the electronic dial 205 per se is rotated to generate the pulse signal in accordance with a turning operation by the user. Further, it can be a device (a so-called touch wheel) that detects an operation such as the revolution of the user's finger on the controller wheel 204 without by controller wheel 204 itself being rotated. A moving image recording button 206 is an operation member for a start instruction and stop instruction for moving image recording.

Included among the operation units 120 is also a touch panel 129 that is capable of detecting a touch operation on display surface (touch sensitive surface) of the display unit 111. The touch panel 129 and the display unit 111 can be constructed as a single integrated unit. For example, the touch panel 129 is constructed in such a manner that the transmittance of light will not interfere with the display presented by the display unit 111, and it is attached to the uppermost layer of the display face of the display unit 111. In addition, input coordinates on the touch panel 129 and display coordinates on the display unit 111 are correlated. As a result, a GUI can be constructed that makes it possible for the user to directly manipulate the screen displayed on the display unit 111. The system control unit 101 is capable of detecting the following operations performed by contacting the touch panel 129: touching of the panel 129 using a finger or pen (referred to as "touch-down" below); a state in which the touch panel 129 is in contact with a finger or pen (referred to as "touch-on" below); movement of a finger or pen while in contact with the touch panel 129 (referred to as "touch-move" below); lifting of a finger or pen that has been in contact with the touch panel 129 (referred to as "touch-up" below); and a state in which the touch panel 129 is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations and position coordinates at which the touch panel 129 is being touched by the finger or pen are communicated to the system control unit 101 through an internal bus and, based upon the information thus communicated, the system control unit 101 determines what kind of operation was performed on the touch panel 129. As for "touch-move", the determination can be made also for every vertical component and horizontal component with regard to the direction of movement of the finger or pen, which is moved on the touch panel 129, based upon a change in the coordinate position. Further, it is assumed that a stroke has been made when "touch-up" is performed following a regular "touch-move" after a "touch-down" on the touch panel 129. A very quick stroke action is referred to as a "flick". A "flick" is an operation in which, with fingers in contact with the touch panel 129, the fingers are moved rapidly over a certain distance and then lifted. In other words, this is a rapid tracing operation in which the fingers are flicked across the surface of the touch panel 129. The system control unit 101 can determine that a "flick" has been performed when it detects such movement over a predetermined distance or greater and at a predetermined speed or greater and then detects "touch-up". Further, the system control unit 101 can determine that "drag" has been performed if it detects movement over a predetermined distance or greater at a speed less than a predetermined speed. The following operations can also be detected: an operation in which a finger or pen enters a specific region while performing touch-move on the touch panel 129 (referred to as "move-in" below), and an operation in which a finger or pen exits a specific region while performing touch-move on the touch panel 129 (referred to as "move-out" below).

The touch panel may employ a method that relies upon any of the following: resistive film, electrostatic capacitance, surface acoustic waves, infrared radiation, electromagnetic induction, image recognition and optical sensing.

The zooming operation unit 128 is a ring-shaped, rotatable operation member that is mounted on the periphery of a lens barrel of the photographing lens 104. Rotating the zooming operation unit 128 in the forward or reverse direction causes the zoom lens to move between the telephoto end and the wide-angle end, thereby enabling an optical zooming operation. Note that when the photographing lens 104 is fixed to the digital camera 100, a zooming operation can be performed electrically using the operation units 120.

The accessory shoe 208 enables the external accessory 126, such as a flash, to be mounted mechanically or electrically on the top face of the digital camera 100.

The display unit 111 is connected to the back face of the digital camera 100 in such a manner that it is rotatable in the up-down direction with a hinge portion serving as a rotation axis (rotatable around a horizontal axis perpendicular to an optical axis), and that its display face is tiltable with respect to the direction of gravity; therefore, the user can freely change a rotation angle and a tilt angle of the display unit 111. A position detection unit 127 detects the position of the display unit 111 relative to the digital camera 100, or a change in such a relative position. Based on the rotation angle and the tilt angle detected by the position detection unit 127, the system control unit 101 can determine whether the display face of the display unit 111 is facing the same direction as the photographing lens 104 of the digital camera 100 or facing the direction opposite to the photographing lens 104 (facing the same direction as the back face). Note that the type of the display unit 111 is not limited to the aforementioned tilt type; it may be a vari-angle type that enables a change in the direction and angle of the display face by enabling rotation around two perpendicular axes with hinge portions serving as rotation axes.

A strap can be attached to the strap attachment members 210L, 210R. The user can hang the digital camera 100 from the user's neck using the attached strap. When the digital camera 100 hung from the neck is in a non-operating state (a state in which the digital camera 100 is not hand-held), its back face comes in contact with or proximity to the abdominal area of the user on an increasing number of occasions. Therefore, there is a possibility that the touch panel 129 detects the contact with or proximity to the abdominal area of the user as a touch operation, causing an erroneous operation. The present embodiment reduces such an erroneous operation caused by a touch operation by, for example, activating a later-described touch-lock function or display-off function.

<Touch-Lock Function>

The following describes a function of preventing an erroneous operation using the touch-lock function according to the present embodiment with reference to FIGS. 4A to 4C and 5A to 5C.

Figure 4A:
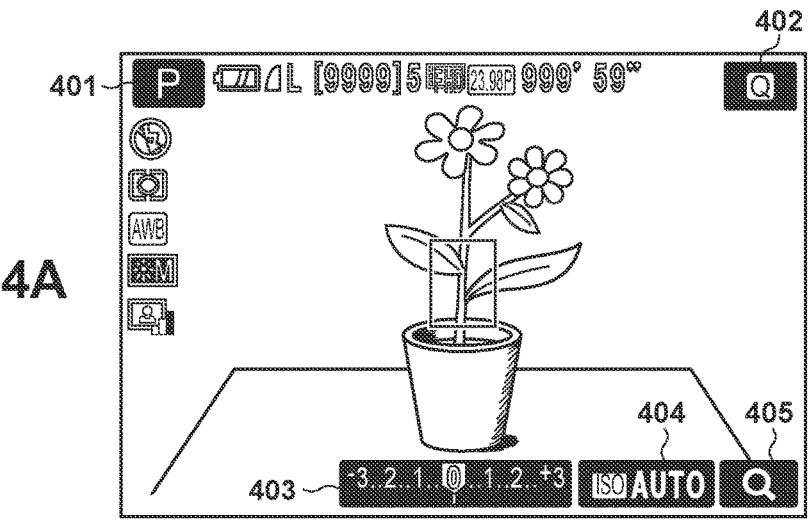
FIGS. 4A to 4C each show an example of a display screen that is displayed when a touch operation on a touch panel has been set to be valid or invalid.
Figure 4B:
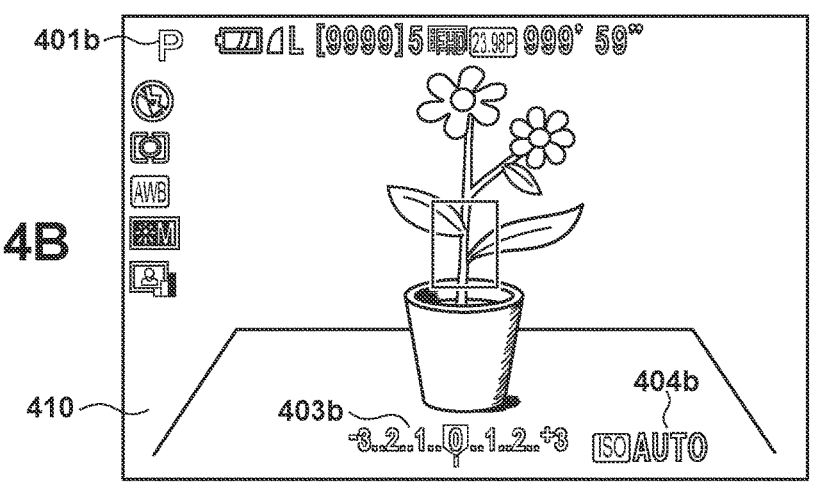
Figure 4C:
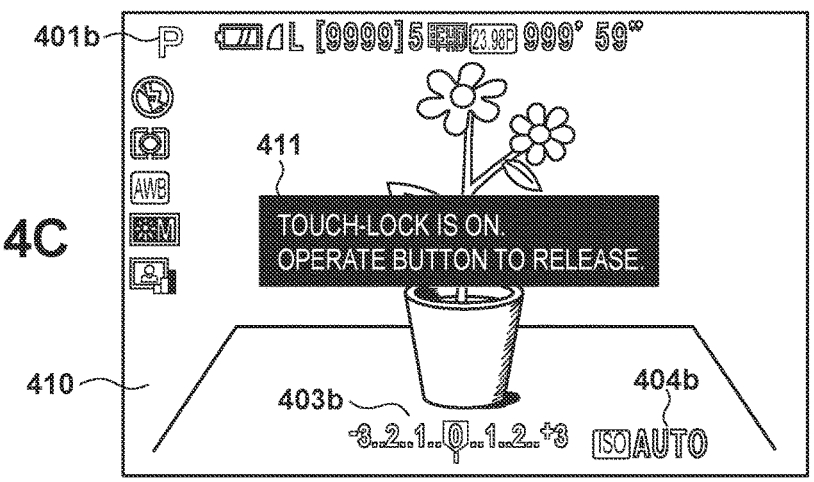

FIGS. 4A to 4C each show an example of a display screen that is displayed when a touch operation on the touch panel has been set to be valid or invalid during a shooting standby state, and FIGS. 5A to 5C show examples of menu screens on which a touch-lock setting for invalidating a touch operation on the touch panel can be configured.

As shown in FIG. 4A, when a touch operation on the touch panel has been set to be valid, the display screen displays a live view image 410 together with touch-sensitive GUI touch buttons 401 to 405 superimposed thereon, and these buttons are displayed with frames indicating that corresponding functions are activated by tapping these buttons. By looking at the display appearance of the touch buttons 401 to 405, the user can intuitively recognize that a touch operation on these buttons is valid. The touch button 401 indicates a current shooting mode, and is used to change the current shooting mode to another shooting mode. The touch button 402 is a quick setting button for making a transition to a setting change screen on which various settings related to shooting performed by the digital camera 100 (shooting settings) can be changed by a touch operation. The touch button 403 indicates the states of an exposure correction setting and a bracket shooting setting, which are included among the shooting settings, and is used to display a setting screen on which the exposure correction setting and the bracket shooting setting can be changed by a touch operation. The touch button 404 indicates a current setting value of an ISO film speed setting, which is included among the shooting settings, and is used to display a setting screen on which the ISO film speed setting can be changed by a touch operation. The touch button 405 is used to display an enlarged live view image, that is to say, a magnified version of the live view image 410. When a position other than the positions of the touch buttons 401 to 405 is touched on the display screen, touch AF is executed, that is to say, automatic focus processing for focusing on the touched position is executed. When touch shutter has been preset to on via a setting menu, the automatic focus processing is executed in accordance with the touched position, shooting is performed, and an image obtained through the shooting is recorded to the recording medium 124.

In the state of FIG. 4A in which a touch operation is valid, if the user accidentally performs a touch operation on the touch panel, a function corresponding to the accidental touch operation is executed against the user's intention. This gives rise to the possibility that the shooting settings or the shooting mode is changed, or shooting is performed, against the user's intention. In the present embodiment, such inconvenience is eliminated as follows: when no operation has been performed on the digital camera 100 for a predetermined period, it is determined that the user is not performing any operation related to shooting or settings, and the touch operation setting is automatically changed from valid to invalid, thereby making a transition to a touch-lock state. During the touch-lock state, a touch on the touch panel is detected, but a touch operation does not cause the execution of the aforementioned various functions because an event is not distributed to function blocks that perform various types of control. That is to say, the execution of a function corresponding to a touch operation is essentially invalid. However, guidance indicating that the touch-lock state is in effect is displayed.

In the touch-lock state shown in FIG. 4B, the live view image 410 is displayed but the touch buttons 402, 405 are hidden on the display screen. Furthermore, the touch buttons 401, 403, 404 are changed to display items 401b, 403b, 404b; specifically, their display appearance indicating that a touch operation thereon is valid, is changed to a display appearance that merely presents information of the current shooting settings (serving a function of merely presenting information). By thus changing the display appearance of the touch buttons, the user can easily recognize that a touch operation is invalid. When the display screen is touched during the touch-lock state, guidance 411 indicating the invalid state of a touch operation is displayed, as shown in FIG. 4C, to let the user know that the touch-lock state is in effect. The guidance 411 also indicates that the touch-lock setting can be released by an operation other than a touch operation, that is to say, by operating any of the operation members including buttons and dials. By operating any of the operation members, the user can release the touch-lock setting and execute a function corresponding to the operated operation member. For example, when the shutter-release button 115 is pressed (half-way or fully) during the touch-lock state, the touch-lock setting is released, and a shooting preparation operation or a shooting operation is started. For example, when the menu button 201 is pressed during the touch-lock state, the touch-lock setting is released, and a menu screen is displayed to immediately enable various types of setting operations. As it is not necessary to perform a special operation to release the touch-lock setting, the usability is not reduced with respect to functions that need to be executed promptly, such as a shooting operation.

According to the foregoing description, a transition is made to the touch-lock state on the condition that no operation has been performed on the digital camera 100 for the predetermined period; in this context, "operation" on the digital camera 100 refers not only to a touch operation and an operation on the operation members including buttons and dials, but also to detection of mounting of the external accessory 126, a zooming operation, or a similar change in the operation or state of the digital camera 100 caused by an external change. The same goes for the condition for releasing the touch-lock setting, except that a touch operation is not taken into consideration.

The purpose of the touch-lock function is to prevent an erroneous operation caused by a touch operation during a shooting standby state, and the touch-lock function is activated only during a shooting standby state. Therefore, the touch-lock function is not activated when the digital camera 100 is deemed in operation, e.g., when a menu screen is displayed or during a reproduction mode. Furthermore, the touch-lock function is not activated also in situations that are based on a touch operation, for example, during recognition and tracking of an object that has been selected by a touch operation on a screen displaying the object, when a live view image is displayed together with a setting screen that enables a shooting parameter of the digital camera 100 to be changed by a touch operation, and when the display unit 111 has been rotated by 180 degrees and faces the same direction as the photographing lens 104 (the front face) (e.g., during a selfie mode in which a photographer photographs him/herself).

A method for setting the touch-lock function will now be described with reference to the examples of the menu screens shown in FIGS. 5A to 5C.

As shown in FIG. 5A, a first layer of a camera setting menu presents items including an item for setting the touch-lock function, and upon selection of one of the items, a transition is made to a second layer of the camera setting menu as shown in FIG. 5B (here, a menu screen for setting the touch-lock function). On this menu screen, the touch-lock setting can be enabled ("enable") or disabled ("disable"), and a period until activation of the touch-lock function can be selected. When the touch-lock function is set to "disable," a transition to the touch-lock state is not made regardless of a period for which the digital camera 100 is not operated. As shown in FIG. 5C, in the present embodiment, the period until activation of the touch-lock function can be selected from among six options, that is to say, 3 seconds, 5 seconds, 7 seconds, 10 seconds, 15 seconds, and 20 seconds. Once the user has set the touch-lock function to "enable" or "disable" and set the period until activation of the touch-lock function (a touch-lock period) on the menu screens for setting the touch-lock function, these settings are stored to the nonvolatile memory 114.

The digital camera 100 according to the present embodiment also has the display-off function that is intended to save power. Similarly to the touch-lock function, the display-off function turns off the power of the display unit 111 when no operation has been performed on the digital camera 100 for a predetermined period, thereby reducing power consumption. Furthermore, during a display-off state, a touch operation is invalid, and hence an erroneous operation caused by an accidental touch operation can be prevented, similarly to the touch-lock function. Similarly to the touch-lock function, the display-off function causes a transition to the display-off state when no operation has been performed on the digital camera 100 for the predetermined period. However, unlike the touch-lock function, the display-off function can be activated not only during a shooting standby state, but also in any other situations in which shooting processing is not executed. Although a condition for releasing the display-off function is similar to the condition for releasing the touch-lock function, functions may be or may not be activated after the release of the display-off function depending on the operation members. During the display-off state, screen display is turned off, and the user cannot check the state of the digital camera 100. Therefore, basically, when any of the operation members is operated during the display-off state, only the display-off function is released, and a corresponding function is not activated. However, this rule does not apply to functions that need to be executed promptly, such as a shooting operation; these functions are activated at the same time as the release of the display-off function. For example, when the menu button 201 is pressed during the display-off state, only the release of the display-off function is performed; on the other hand, when the shutter-release button 115 is operated during the display-off state, shooting processing is started at the same time as the release of the display-off function. That is to say, functions are activated differently depending on whether the activation takes place during the display-off state in which screen display is turned off, or during the touch-lock state in which a live view image is displayed.

A method for setting the display-off function will now be described with reference to examples of menu screens shown in FIGS. 6A and 6B.

Figure 6A:
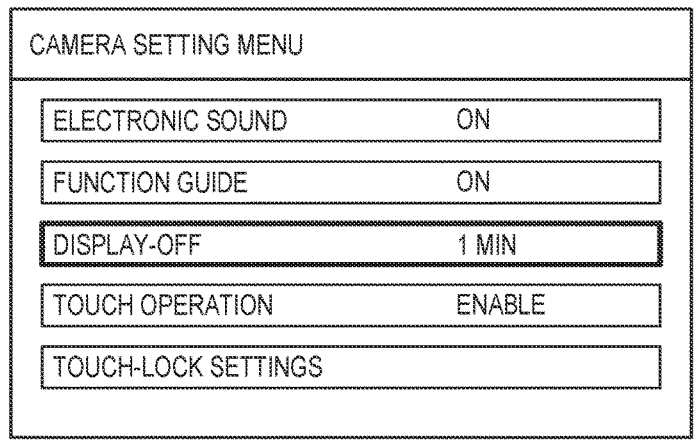
FIGS. 6A and 6B show examples of menu screens on which settings of the display-off function can be configured.
Figure 6B:
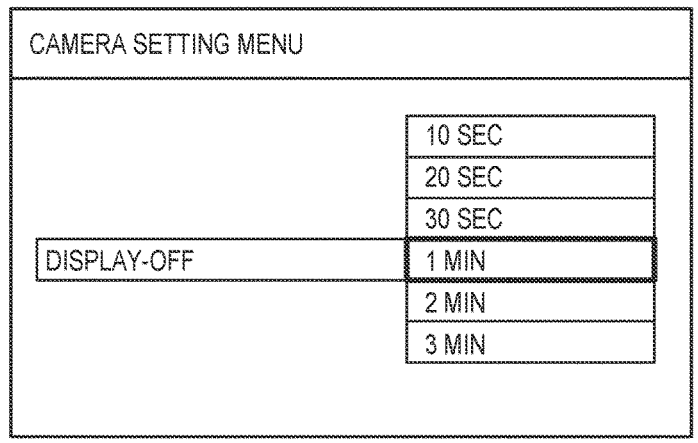

As shown in FIG. 6A, the first layer of the camera setting menu presents items including an item for setting the display-off function, and upon selection of this item, a menu screen for setting the display-off function is displayed, as shown in FIG. 6B, to enable selection of a period until activation of the display-off function. In the present embodiment, the period until activation of the display-off function can be selected from among six options, that is to say, 10 seconds, 20 seconds, 30 seconds, 1 minute, 2 minutes, and 3 minutes. Once the user has set the period until activation of the display-off function on the menu screen for setting the display-off function, this setting is stored to the nonvolatile memory 114.

The maximum of 3 minutes can be set as the period until activation of the display-off function. On the other hand, the maximum of 20 seconds can be set as the period until activation of the touch-lock function. As the display-off state, which is intended to save power, renders a touch operation invalid, the display-off state doubles as the touch-lock state, which is intended to prevent an erroneous operation caused by a touch operation. For this reason, the maximum period that can be set for the display-off function is longer than the maximum period that can be set for the touch-lock function; the period until activation of the touch-lock function can be set to be longer than 20 seconds by making use of the settings of the display-off function. Furthermore, as the touch-lock function and the display-off function are independent of each other, both functions can be used simultaneously.

<Processing for Activating and Releasing Touch-Lock Function and Display-Off Function>

Processing for activating and releasing the touch-lock function and the display-off function according to the present embodiment will now be described with reference to FIGS. 3A and 3B.

Figure 3A:
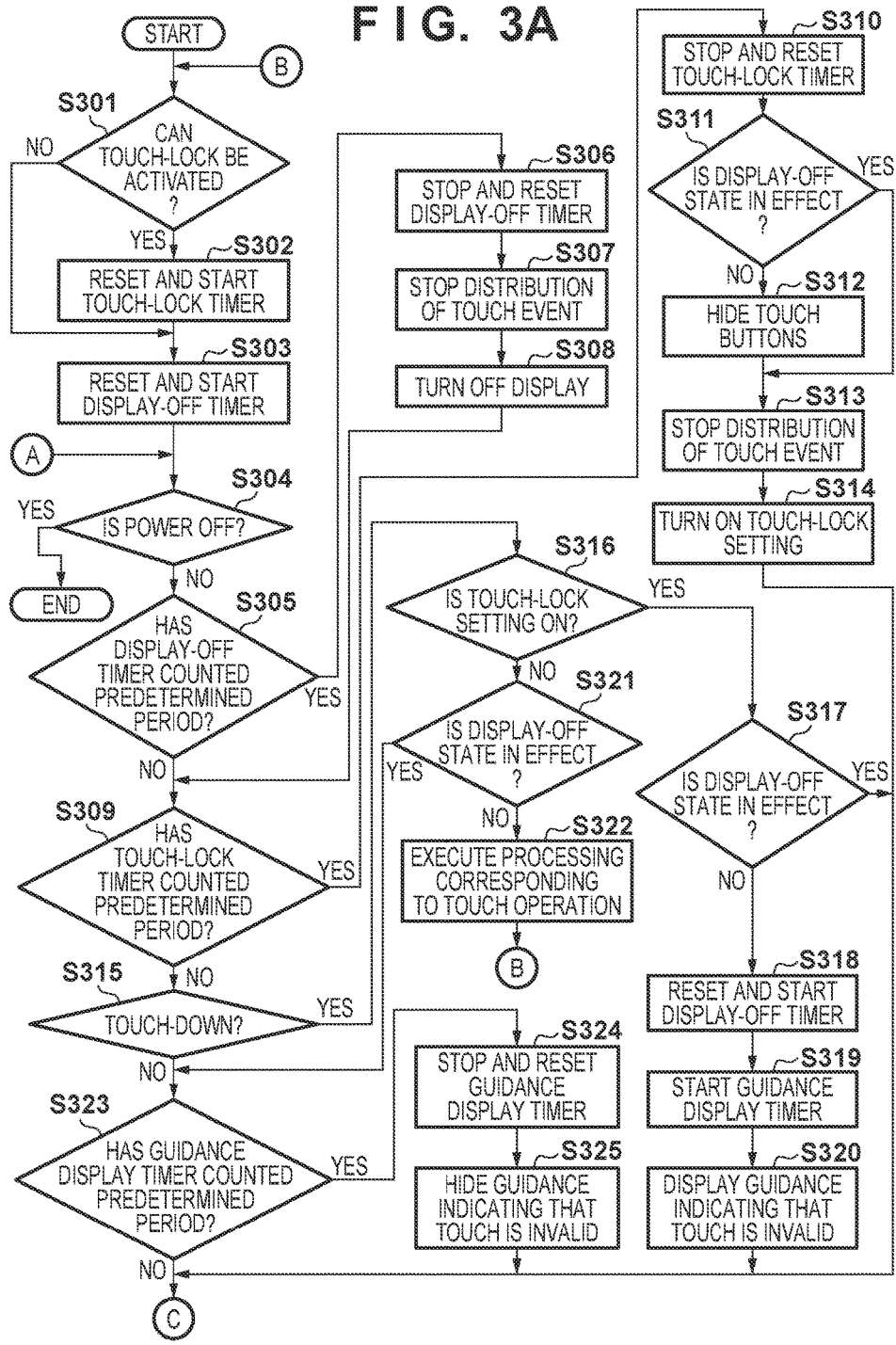
FIGS. 3A and 3B are flowcharts of an example of processing for activating and releasing a touch-lock function and a display-off function according to the present embodiment.
Figure 3B:
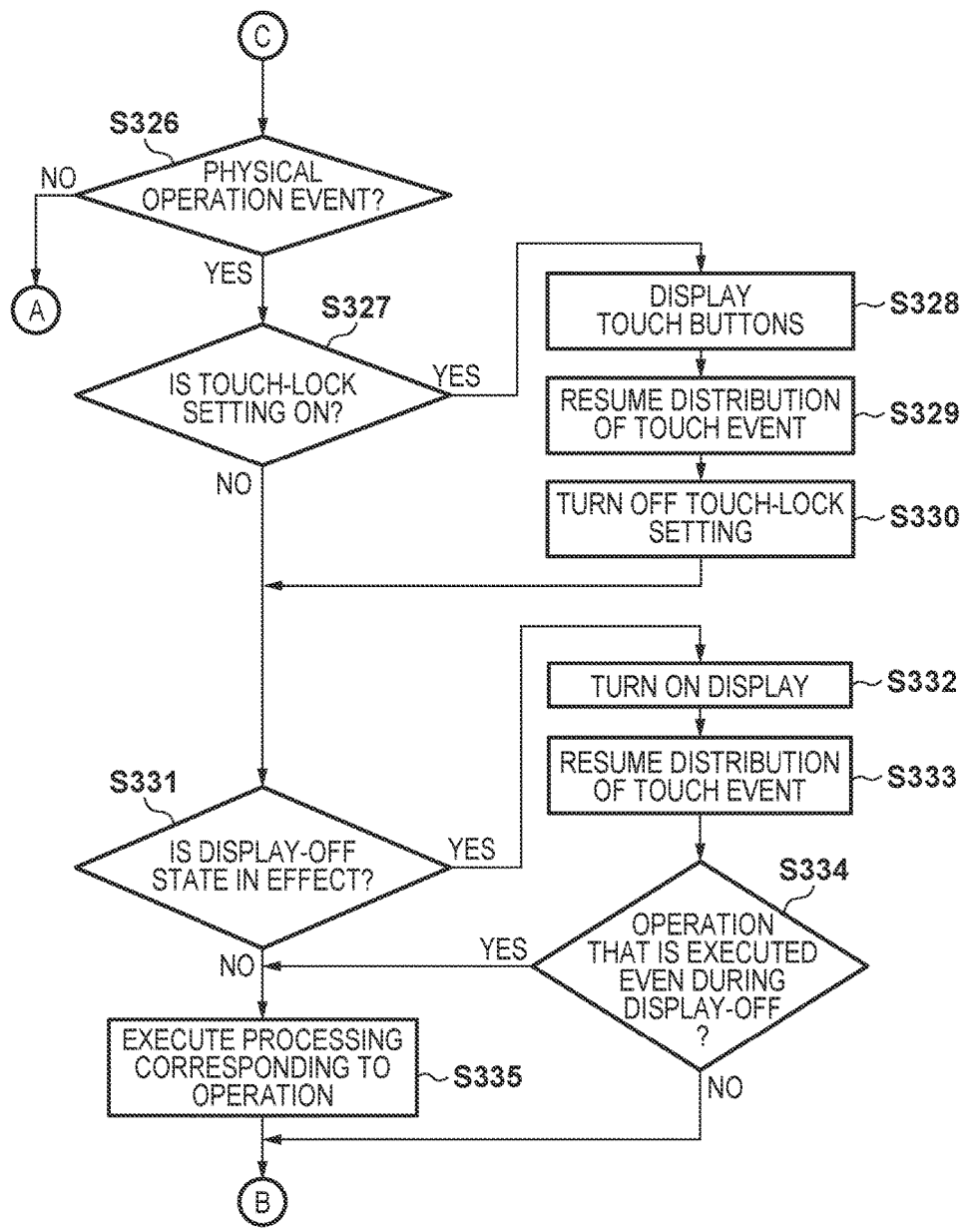

Note that the processing of FIGS. 3A and 3B is realized by deploying a program stored in the nonvolatile memory 114 to the system memory 112 and causing the system control unit 101 to execute the deployed program at the start of display of a shooting standby screen.

In step S301, once the display of the shooting standby screen has been started, the system control unit 101 first determines whether the touch-lock function can be activated. The touch-lock function can be activated when the following conditions are all satisfied: the digital camera 100 is in none of the following situations in which the touch-lock function is not activated, the touch-lock setting is set to "enable", and a shooting standby state is in effect. During the shooting standby state, a live view image is displayed as shown in FIG. 4A. Note that the conditions for activating the touch-lock function are not satisfied in the following situations (the situations in which the touch-lock function is not activated).

The touch-lock setting is set to "disable" on a screen for setting the touch-lock function.

During display of a menu screen, a screen at a layer below a menu screen, a FUNC menu screen, or a quick setting screen, or during display of a reproduction image in a reproduction mode.

During bulb shooting, long exposure, or countdown of a self-timer.

The display face of the display unit 111 is facing the same direction as the photographing lens 104 (the display face has been flipped upward by 180°).

During object tracking (touch AF, catch AF, or face selection), during automatic zoom control that is performed in coordination with a detected face using a framing assist function, or during focus-lock.

The photographing lens is in a retracted state.

If the touch-lock function can be activated in step S301, the process proceeds to step S302, and if the touch-lock function cannot be activated, the process proceeds to step S303. When the process proceeds to step S303 by skipping step S302, a touch-lock timer is not started, and thus the result of the later-described determination in step S309 as to whether the touch-lock timer has counted a predetermined period is NO.

In step S302, the system control unit 101 resets (initializes) and starts the touch-lock timer.

In step S303, the system control unit 101 resets (initializes) and starts a display-off timer. The display-off timer is started even when the aforementioned conditions for activating the touch-lock function are not satisfied. For example, the display-off timer is started even during display of a menu screen or a reproduction screen.

In step S304, the system control unit 101 determines whether the power button 119 has been pressed; if pressed, the display of the shooting standby screen is ended.

In step S305, the system control unit 101 determines whether the display-off timer has counted a display-off period that has been set on the menu screen for setting the display-off function (the display-off period is a value that has been read out from the nonvolatile memory 114). If the display-off period has been counted, processes for activating the display-off function are executed in steps S306 to S308.

Specifically, in step S306, the system control unit 101 stops and resets the display-off timer. In step S307, the system control unit 101 stops distribution of a touch event. As a result, a touch operation is rendered invalid, that is to say, even if a touch operation is detected, a corresponding function is not executed. Note that the detection of a touch operation per se may not be performed. In step S308, the system control unit 101 enters the display-off state by turning off the power of the display unit 111, that is to say, shutting down a display screen. In this way, power for maintaining display on the display unit 111 can be saved, thereby reducing power consumption.

In step S309, the system control unit 101 determines whether the touch-lock timer has counted the touch-lock period that has been set on the menu screen for setting the touch-lock function. The touch-lock period is a value that has been read out from the nonvolatile memory 114. If the touch-lock period has been counted, processes for making a transition to the touch-lock state are executed in steps S310 to S314. Specifically, in step S310, the system control unit 101 stops and resets the touch-lock timer. In step S311, the system control unit 101 determines whether the display-off state is in effect; if the display-off state is not in effect, the process proceeds to step S312, and if the display-off state is in effect, the process proceeds to step S313. In step S312, the system control unit 101 changes the touch buttons displayed on the display unit 111 to be in a hidden state, or changes their display appearance to a display appearance that does not represent touch buttons. Consequently, as mentioned earlier, the touch buttons 402, 405 of FIG. 4A are placed in a hidden state as shown in FIG. 4B. On the other hand, the display appearance of the touch buttons 401, 403, 404 shown in FIG. 4A is changed to the display appearance of the display items 401b, 403b, 404b shown in FIG. 4B. In step S313, the system control unit 101 stops distribution of a touch event. As a result, a touch operation is rendered invalid, that is to say, even if a touch operation is detected, a corresponding function is not executed. For example, even if the live view image 410 is touched, touch AF or touch shutter is not executed. Similarly, even if one of the touch buttons is touched, a corresponding function is not executed. Note that during the touch-lock state, the detection of a touch on the touch panel 129 per se is not invalid. Therefore, guidance indicating that the touch-lock state is in effect can be displayed in response to a touch operation, as will be described later. The digital camera 100 is thus placed in the touch-lock state, and the system control unit 101 stores the on state of the touch-lock setting to the system memory 112 in step S314. If it is determined in step S311 that the display-off state is in effect, the process for hiding the touch buttons (step S312) is skipped as the display need not be changed.

The following describes processes for displaying guidance during the touch-lock state in steps S315 to S322.

In step S315, the system control unit 101 determines whether touch-down has been performed on the touch panel 129; if touch-down has been performed, the process proceeds to step S316, and if touch-down has not been performed, the process proceeds to step S323.

In step S316, the system control unit 101 determines whether the touch-lock state is in effect with reference to the system memory 112; if the touch-lock state is in effect, the process proceeds to step S317, and if the touch-lock state is not in effect, the process proceeds to step S321.

In step S317, the system control unit 101 determines whether the display-off state is in effect with reference to the system memory 112. If the display-off state is in effect, the guidance is not displayed, and thus the process proceeds to step S326, and if the display-off state is not in effect, the process proceeds to step S318.

In step S318, the system control unit 101 resets (initializes) and starts the display-off timer. That is to say, the period until activation of the display-off function is extended by a touch operation performed during the touch-lock state.

In step S319, the system control unit 101 starts a guidance display timer. The guidance display timer counts a period of display of the guidance (the displayed guidance is automatically hidden upon elapse of the period); for example, 4 seconds is set as the period.

In step S320, the system control unit 101 displays, on the display unit 111, the guidance 411 indicating that a touch operation is invalid as the touch-lock state is in effect. That is to say, the guidance 411 shown in FIG. 4C is displayed.

In step S321, the system control unit 101 determines whether the display-off state is in effect with reference to the system memory 112. If the display-off state is in effect, processing corresponding to the touch is not executed, and thus the process proceeds to step S323, and if the display-off state is not in effect, the process proceeds to step S322.

In step S322, the system control unit 101 executes processing corresponding to a touch operation originating from the touch-down detected in step S315. For example, when the touch-down has been performed on one of the touch buttons 401 to 405, the display appearance of the touch button on which the touch-down has been performed is changed, upon the touch-down, to a display appearance indicating a touched state. Thereafter, when touch-up is detected at the position of this touch button, a function of this touch button is executed. Functions of the touch buttons 401 to 405 that are executed upon touch-up have already been described earlier. On the other hand, when the touch-down has been performed on the live view image 410 at a position other than the positions of the touch buttons, the aforementioned touch AF or touch shutter is executed with respect to the touched position.

In step S323, the system control unit 101 determines whether the guidance display timer has counted a predetermined period (e.g., 4 seconds); if the predetermined period has been counted, the process proceeds to step S324, and if the predetermined period has not been counted, the process proceeds to step S326.

In step S324, the system control unit 101 stops and resets the guidance display timer.

In step S325, the system control unit 101 hides the displayed guidance 411.

In step S326, the system control unit 101 determines whether there has been a physical operation event. The system control unit 101 determines that there has been a physical operation event when a certain operation has been performed. Examples of the certain operation performed on operation members other than the touch panel 129 include: pressing of the menu button 201, the cross key 202, the SET button 203, the moving image recording button 206, or the shutter-release button 115, rotation of the electronic dial 205, the controller wheel 204, or the mode switching dial 118, detection of mechanical rotation of the display unit 111, and detection of mounting of the external accessory 126 on the accessory shoe 208. Note that a touch operation on the touch panel 129, a change in the orientation of the digital camera 100, and the like are not determined as a physical operation event. If it is determined in step S326 that there has been a physical operation event, the process proceeds to step S327, and if it is determined that there has been no physical operation event, the process returns to step S304, and the processes are repeated.

In step S327, the system control unit 101 determines whether the touch-lock state is in effect with reference to the system memory 112; if the touch-lock state is in effect, the process proceeds to step S328, and if the touch-lock state is not in effect, the process proceeds to step S331.

The following describes processes for releasing the touch-lock setting in steps S328 to S330.

In step S328, the system control unit 101 changes the display unit 111 to be in a display state in which the touch buttons are displayed. Consequently, as mentioned earlier, the display state of FIG. 4B is changed to the display state of FIG. 4A (the original display state is restored). Specifically, the touch buttons 402, 405 are displayed, and the display appearance of the display items 401b, 403b, 404b is changed to the display appearance of the touch buttons 401, 403, 404. In step S329, the system control unit 101 resumes distribution of a touch event. As a result, a touch operation is rendered valid, that is to say, when a touch operation is detected, a function corresponding to the touch is executed. In step S330, the system control unit 101 stores the off state of the touch-lock setting to the system memory 112. The touch-lock setting is released also in response to detection of mechanical rotation of the display unit 111 and detection of mounting of the external accessory 126 on the accessory shoe 208. For example, the touch-lock setting is released when the display unit 111 has been rotated from the position where it faces the direction opposite to the photographing lens 104 of the digital camera 100 (faces the same direction as the back face) to the position where it faces the same direction as the photographing lens 104, or conversely, when it has been rotated from the position where it faces the same direction as the photographing lens 104 to the position where it faces the direction opposite to the photographing lens 104.

In step S331, the system control unit 101 determines whether the display-off state is in effect with reference to the system memory 112. If the display-off state is in effect, the process proceeds to step S332 to release the display-off function (to revert to a state prior to the display-off state), and if the display-off state is not in effect, the process proceeds to step S335.

In step S332, the system control unit 101 releases the display-off function by turning on the power of the display unit 111, thereby resuming display on the display unit 111. In step S333, the system control unit 101 resumes distribution of a touch event. As a result, a touch operation is rendered valid, that is to say, when a touch operation is detected, a function corresponding to the touch is executed.

In step S334, the system control unit 101 determines whether the physical operation event detected in step S326 is an instruction for processing that is executed even during the display-off state. If the physical operation event is the instruction for processing that is executed even during the display-off state, the process proceeds to step S335, and if the physical operation event is not the instruction for processing that is executed even during the display-off state, the process returns to step S301, each of the touch-lock timer and the display-off timer is reset and resumed, and the processes are repeated. The instruction for processing that is executed even during the display-off state is, for example, pressing of the shutter-release button 115. When the shutter-release button 115 has been pressed, the display-off function is released, and the process proceeds to step S335 to execute AF in response to half-way pressing or perform shooting in response to full pressing.

In step S335, the system control unit 101 executes processing corresponding to the operation event detected in step S326. For example, when the menu button 201 has been pressed, a menu screen is displayed. When the electronic dial 205 or the controller wheel 204 has been operated, the shooting settings are changed in accordance with the operation. When the display unit 111 has been rotated from the position where it faces the direction opposite to the photographing lens 104 of the digital camera 100 to the position where it faces the same direction as the photographing lens 104, processing for inverting display of the display items, processing for performing mirror-display of the live view image or the like is performed. Then, the process returns to step S301, each of the touch-lock timer and the display-off timer is reset and resumed, and the processes are repeated.

As described above, the present embodiment can prevent an erroneous operation caused by a touch operation on the touch panel while suppressing a reduction in the usability of the digital camera 100.

Note that a single item of hardware may control the system control unit 101, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to the digital camera 100, the present invention is not limited to this example. The present invention is applicable to, for example, an apparatus capable of setting a touch operation on a display unit having a touch panel to be valid or invalid. More specifically, the present invention is applicable to a personal computer, a tablet terminal which is a kind of a personal computer, a mobile telephone terminal, a smart phone which is a kind of a mobile telephone terminal, a PDA (Personal Digital Assistant), a mobile image viewer, a printer device having a display function, a digital photo frame, a music player, a game console, an electronic book reader, medical equipment and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201540, filed Oct. 9, 2015 which is hereby incorporated by reference herein in its entirety.

What is claimed is:

1. An electronic apparatus, comprising:
a detector configured to detect a touch operation on a touch sensitive surface;
an input device that is located at a position different from a position of the touch sensitive surface;
at least one processor; and
at least one memory having stored thereon instructions that, when executed by the at least one processor, cause the at least one processor and the at least one memory to function as a control unit configured to:
perform control to display a live view image captured by an image capturing unit on a display unit, wherein:
when neither the touch operation nor an operation on the input device has been performed for a first period during a shooting standby state in which the live view image is displayed, control is performed to switch to a lock state without hiding the display of the live view image on the display unit, the lock state restricting execution of a function corresponding to the touch operation,
during a second state that differs from the shooting standby state, control is performed to not switch to the lock state even when neither the touch operation nor the operation on the input device has been performed for the first period, and
upon accepting the operation on the input device during the lock state, control is performed to switch to a state in which the function corresponding to the touch operation is executed by releasing the lock state, and to execute a function corresponding to the operation on the input device.

2. The apparatus according to claim 1, the at least one memory further having stored thereon instructions that, when executed by the at least one processor, cause the at least one processor and the at least one memory to function as the control unit, which is further configured to:
when neither the touch operation nor the operation on the input device has been performed for a second period that is longer than the first period, perform control to hide the display on the display unit.

3. The apparatus according to claim 1, the at least one memory further having stored thereon instructions that, when executed by the at least one processor, cause the at least one processor and the at least one memory to function as the control unit, which is further configured to:
when the detector detects the touch operation during the lock state, perform control to display guidance indicating that the lock state is in effect.

4. The apparatus according to claim 3, wherein the guidance includes an operation method for releasing the lock state.

5. The apparatus according to claim 1, the at least one memory further having stored thereon instructions that, when executed by the at least one processor, cause the at least one processor and the at least one memory to function as the control unit, which is further configured to:
when the touch operation has been performed on a touch button displayed on the display unit while the lock state is not in effect, perform control to execute a specific function assigned to the touch button on which the touch operation has been performed, and
during the lock state, perform control such that the specific function is not executed regardless of the touch operation.

6. The apparatus according to claim 1, the at least one memory further having stored thereon instructions that, when executed by the at least one processor, cause the at least one processor and the at least one memory to function as the control unit, which is further configured to:
perform control such that a display appearance of a touch button which is displayed on the display unit while the lock state is not in effect and which is intended to change a setting of a specific setting item is changed, upon switching to the lock state, to a display appearance intended to present information of a setting state of the specific setting item.

7. The apparatus according to claim 1, the at least one memory further having stored thereon instructions that, when executed by the at least one processor, cause the at least one processor and the at least one memory to function as the control unit, which is further configured to:
configure a setting related to image capture performed by the image capturing unit in accordance with the operation on the input device, wherein
the instructions executed by the at least one processor of the control unit cause the control unit to perform control to configure the setting related to the image capture in accordance with the operation accepted by the input device, even during the lock state.

8. The apparatus according to claim 1, wherein
when the operation on the input device is a shooting instruction and has been accepted by a shutter-release button that composes the input device, the at least one memory further has stored thereon instructions that, when executed by the at least one processor, cause the at least one processor and the at least one memory to function as the control unit, which is further configured to perform control to execute a series of shooting processing including image capture by the image capturing unit and recording of an image to a recording medium, even during the lock state.

9. The apparatus according to claim 1, wherein the second state is a state in which an image is reproduced and displayed.

10. The apparatus according to claim 1, wherein the second state is a state in which the live view image is not displayed but a menu screen for configuring various settings of the electronic apparatus is displayed.

11. The apparatus according to claim 1, wherein
when the touch operation has been performed on the live view image displayed on the display unit while the lock state is not in effect, the at least one memory further has stored thereon instructions that, when executed by the at least one processor, cause the at least one processor and the at least one memory to function as the control unit, which is further configured to perform control to execute automatic focus processing based on a position of the touch operation, and
during the lock state, the at least one memory further has stored thereon instructions that, when executed by the at least one processor, cause the at least one processor and the at least one memory to function as the control unit, which is further configured to perform control such that the automatic focus processing is not executed even when the touch operation has been performed on the live view image displayed on the display unit.

12. The apparatus according to claim 1, wherein
when the touch operation has been performed during the shooting standby state while the lock state is not in effect, the at least one memory further has stored thereon instructions that, when executed by the at least one processor, cause the at least one processor and the at least one memory to function as the control unit, which is further configured to perform control to execute a series of shooting processing including image capture by the image capturing unit and recording of an image to a recording medium, and during the lock state, the at least one memory further has stored thereon instructions that, when executed by the at least one processor, cause the at least one processor and the at least one memory to function as the control unit, which is further configured to perform control such that the shooting processing is not executed even when the touch operation has been performed.

13. The apparatus according to claim 1, wherein
the display unit is connected in such a manner that a position thereof relative to the electronic apparatus is changeable, and includes a position detector configured to detect the position of the display unit, and when the position of the display unit detected by the position detector matches a predetermined position during the lock state, the at least one memory further has stored thereon instructions that, when executed by the at least one processor, cause the at least one processor and the at least one memory to function as the control unit, which is further configured to perform control to switch to the state in which the function corresponding to the touch operation is executed by releasing the lock state.

14. The apparatus according to claim 1, wherein
upon detection of connection of an external device to the electronic apparatus during the lock state, the at least one memory further has stored thereon instructions that, when executed by the at least one processor, cause the at least one processor and the at least one memory to function as the control unit, which is further configured to perform control to switch to the state in which the function corresponding to the touch operation is executed by releasing the lock state.

15. A control method of an electronic apparatus having a detector configured to detect a touch operation on a touch sensitive surface and an input device that is located at a position different from a position of the touch sensitive surface, the method comprising:
performing control to display a live view image captured by an image capturing unit on a display unit, wherein:
when neither the touch operation nor an operation on the input device has been performed for a first period during a shooting standby state in which the live view image is displayed, control is performed to switch to a lock state without hiding the display of the live view image on a display unit, the lock state restricting execution of a function corresponding to the touch operation,
during a second state that differs from the shooting standby state, control is performed to not switch to the lock state even when neither the touch operation nor the operation on the input device has been performed for the first period, and
upon accepting the operation on the input device during the lock state, control is performed to switch to a state in which the function corresponding to the touch operation is executed by releasing the lock state, and also to execute a function corresponding to the operation on the input device.

16. A non-transitory computer-readable storage medium storing a program for causing a computer to function as a control unit of an electronic apparatus having a detector configured to detect a touch operation on a touch sensitive surface and an input device that is located at a position different from a position of the touch sensitive surface, wherein the control unit is configured to:
perform control to display a live view image captured by an image capturing unit on a display unit, wherein:
when neither the touch operation nor an operation on the input device has been performed for a first period during a shooting standby state in which the live view image is displayed, control is performed to switch to a lock state without hiding display on a display unit, the lock state restricting execution of a function corresponding to the touch operation,
during a second state that differs from the shooting standby state, control is performed to not switch to the lock state even when neither the touch operation nor the operation on the input device has been performed for the first period, and
upon accepting the operation on the input device during the lock state, control is performed to switch to a state in which the function corresponding to the touch operation is executed by releasing the lock state, and execute a function corresponding to the operation on the input device.

17. An electronic apparatus, comprising:
a detector configured to detect a touch operation on a touch sensitive surface;
an input device that is located at a position different from a position of the touch sensitive surface;
a display unit that is connected in such a manner that a position thereof relative to the electronic apparatus is changeable, and includes a position detector configured to detect the position of the display unit;
at least one processor; and
at least one memory having stored thereon instructions that, when executed by the at least one processor, cause the at least one processor and the at least one memory to function as a control unit configured to:
when neither the touch operation nor an operation on the input device has been performed for a first period, perform control to switch to a lock state without hiding display on the display unit, the lock state restricting execution of a function corresponding to the touch operation,
upon accepting the operation on the input device during the lock state, perform control to switch to a state in which the function corresponding to the touch operation is executed by releasing the lock state, and to execute a function corresponding to the operation on the input device, and
when the position of the display unit detected by the position detector matches a predetermined position during the lock state, perform control to switch the state in which the function corresponding to the touch operation is executed by releasing the lock state.

18. The apparatus according to claim 17, the at least one memory further having stored thereon instructions that, when executed by the at least one processor, cause the at least one processor and the at least one memory to function as the control unit, which is further configured to:
perform control to display a live view image captured by an image capturing unit on the display unit, wherein
when neither the touch operation nor the operation on the input device has been performed for the first period during a shooting standby state in which the live view image is displayed, control is performed to switch to the lock state without hiding the display of the live view image on the display unit.

19. The apparatus according to claim 17, wherein when the operation of the input device is a shooting instruction and has been accepted by a shutter-release button that composes the input device, the at least one memory further has stored thereon instructions that, when executed by the at least one processor, cause the at least one processor and the at least one memory to function as the control unit, which is further configured to perform control to execute a series of shooting processing including image capture by the image capturing unit and recording of an image to a recoding medium, even during the lock state.

20. A control method of an electronic apparatus having a detector configured to detect a touch operation on a touch sensitive surface and an input device that is located at a position different from a position of the touch sensitive surface, the method comprising:
performing control to display, via a display unit, a live view image captured by an image capturing unit on a display unit of an electronic apparatus, wherein
the display unit is connected in such a manner that a position thereof relative to the electronic apparatus is changeable, and includes a position detector configured to detect a position of the display unit,
when neither a touch operation nor an operation on an input device of the electronic apparatus has been performed for a first period during a shooting standby state in which the live view message is displayed, control is performed to switch to a lock state without hiding the display of the live view image on the display unit, the lock state restricting execution of a function corresponding to the touch operation,
during a second state that differs from the shooting standby state, control is performed to not switch to the lock state even when neither the touch operation nor the operation on the input device has been performed for the first period,
upon accepting the operation on the input device during the lock state, control is performed to switch to a state in which the function corresponding to the touch operation is executed by releasing the lock state, and execute a function corresponding to the operation on the input device, and
when the position of the display unit detected by the position detector matches a predetermined position during the lock state, control is performed to switch the state in which the function corresponding to the touch operation is executed by releasing the lock state.

21. A non-transitory computer-readable storage medium storing a program for causing a computer to function as a control unit of an electronic apparatus having a detector configured to detect a touch operation on a touch sensitive surface and an input device that is located at a position different from a position of the touch sensitive surface, wherein the control unit is configured to:
perform control to display, via a display unit, a live view image captured by an image capturing unit on a display unit, wherein
the display unit is connected in such a manner that a position thereof relative to the electronic apparatus is changeable, and includes a position detector configured to detect a position of the display unit,
when neither the touch operation nor an operation on the input device has been performed for a first period during a shooting standby state in which the live view image is displayed, control is performed to switch to a lock state without hiding the display of the live view image on the display unit, the lock state restricting execution of a function corresponding to the touch operation,
during a second state that differs from the shooting standby state, control is performed to not switch to the lock state even when neither the touch operation nor the operation on the input device has been performed for the first period,
upon accepting the operation on the input device during the lock state, control is performed to switch to a state in which the function corresponding to the touch operation is executed by releasing the lock state, and to execute a function corresponding to the operation on the input device, and
when the position of the display unit detected by the position detector matches a predetermined position during the lock state, control is performed to switch the state in which the function corresponding to the touch operation is executed by releasing the lock state.

22. An electronic apparatus, comprising:
a detector configured to detect a touch operation on a touch sensitive surface;
an input device that is located at a position different from a position of the touch sensitive surface;
at least one processor; and
at least one memory having stored thereon instructions that, when executed by the at least one processor, cause the at least one processor and the at least one memory to function as a control unit configured to:
when neither the touch operation nor an operation on the input device has been performed for a first period, perform control to switch to a lock state without hiding display on a display unit, the lock state restricting execution of a function corresponding to the touch operation,
upon accepting the operation on the input device during the lock state, perform control to switch to a state in which the function corresponding to the touch operation is executed by releasing the lock state, and to execute a function corresponding to the operation on the input device, and
upon detection of connection of an external device to the electronic apparatus during the lock state, perform control to switch to the state in which the function corresponding to the touch operation is executed by releasing the lock state.

23. The electronic apparatus according to claim 22, the at least one memory further having stored thereon instructions that, when executed by the at least one processor, cause the at least one processor and the at least one memory to function as the control unit, which is further configured to:
perform control to display a live view image captured by an image capturing unit on the display unit, wherein when neither the touch operation nor the operation on the input device has been performed for the first period during a shooting standby state in which the live view image is displayed, the instructions executed by the at least one processor of the control unit causes the control unit to perform control to switch to the lock state without hiding the display of the live view image on the display unit.

24. The electronic apparatus according to claim 22, wherein
when the operation on the input device is a shooting instruction and has been accepted by a shutter-release button that composes the input device, the at least one memory further has stored thereon instructions that, when executed by the at least one processor, causes the at least one processor and the at least one memory to function as the control unit, which is further configured to perform control to execute a series of shooting processing including image capture by the image capturing unit and recording of an image to a recording medium, even during the lock state.

25. A control method of an electronic apparatus having a detector configured to detect a touch operation on a touch sensitive surface and an input device that is located at a position different from a position of the touch sensitive surface, the method comprising:
when neither the touch operation nor an operation on the input device has been performed for a first period, performing control to switch to a lock state without hiding display on a display unit, the lock state restricting execution of a function corresponding to the touch operation,
upon accepting the operation on the input device during the lock state, performing control to switch to a state in which the function corresponding to the touch operation is executed by releasing the lock state, and executing a function corresponding to the operation on the input device, and
upon detection of connection of an external device to the electronic apparatus during the lock state, performing control to switch to the state in which the function corresponding to the touch operation is executed by releasing the lock state.

26. A non-transitory computer-readable storage medium storing a program for causing a computer to function as a control unit of an electronic apparatus having a detector configured to detect a touch operation on a touch sensitive surface and an input device that is located at a position different from a position of the touch sensitive surface, wherein the control unit is configured to:
when neither the touch operation nor an operation on the input device has been performed for a first period, perform control to switch to a lock state without hiding display on a display unit, the lock state restricting execution of a function corresponding to the touch operation,
upon accepting the operation on the input device during the lock state, perform control to switch to a state in which the function corresponding to the touch operation is executed by releasing the lock state, and execute a function corresponding to the operation on the input device, and
upon detection of connection of an external device to the electronic apparatus during the lock state, perform control to switch to the state in which the function corresponding to the touch operation is executed by releasing the lock state.

* * * * *